United States Patent
Kumar et al.

(10) Patent No.: US 9,378,169 B2
(45) Date of Patent: Jun. 28, 2016

(54) METHOD AND SYSTEM FOR CHANGING BUS DIRECTION IN MEMORY SYSTEMS

(71) Applicant: NVIDIA Corporation, Santa Clara, CA (US)

(72) Inventors: Ambuj Kumar, Sunnyvale, CA (US); Brian Keith Langendorf, Benicia, CA (US); Sharath Raghava, Campbell, CA (US); Tony Yuhsiang Cheng, Union City, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 177 days.

(21) Appl. No.: 13/732,060

(22) Filed: Dec. 31, 2012

(65) Prior Publication Data

US 2014/0189180 A1    Jul. 3, 2014

(51) Int. Cl.
*G06F 13/368* (2006.01)
*G06F 13/372* (2006.01)

(52) U.S. Cl.
CPC ............ *G06F 13/372* (2013.01); *G06F 13/368* (2013.01)

(58) Field of Classification Search
CPC ... G06F 13/368; G06F 13/16; G06F 13/1605; G06F 13/1668
USPC .................... 710/240, 243; 711/147, 148, 151
See application file for complete search history.

(56) References Cited

U.S. PATENT DOCUMENTS

| | | | |
|---|---|---|---|
| 5,692,165 A | 11/1997 | Jeddeloh et al. | |
| 6,161,208 A * | 12/2000 | Dutton et al. | 714/764 |
| 6,934,871 B2 | 8/2005 | Day et al. | |
| 7,057,950 B2 | 6/2006 | Lee | |
| 7,155,579 B1 | 12/2006 | Neils et al. | |
| 7,259,606 B2 | 8/2007 | Ku et al. | |
| 7,480,193 B2 | 1/2009 | Ware | |
| 7,647,467 B1 | 1/2010 | Hutsell et al. | |
| 8,019,957 B1 | 9/2011 | White et al. | |
| 8,060,785 B2 | 11/2011 | Lin et al. | |
| 8,081,527 B1 | 12/2011 | Venkataraman et al. | |
| 8,422,263 B2 | 4/2013 | Saito et al. | |
| 2003/0004667 A1 | 1/2003 | Zumkehr | |
| 2003/0236641 A1 | 12/2003 | Liou | |
| 2004/0136462 A1 | 7/2004 | Chen et al. | |
| 2004/0225847 A1 * | 11/2004 | Wastlick et al. | 711/158 |
| 2005/0166110 A1 | 7/2005 | Swanson et al. | |
| 2006/0136681 A1 * | 6/2006 | Jain | G06F 13/1673 711/154 |
| 2010/0039875 A1 | 2/2010 | Stott et al. | |
| 2010/0257397 A1 | 10/2010 | Schoenborn et al. | |
| 2010/0309706 A1 | 12/2010 | Saito et al. | |

(Continued)

OTHER PUBLICATIONS

Mintarno, et al., "Bit-Pattern Sensitivity Analysis and Optimal On-Die-Termination for High-Speed Memory Bus Design", IEEE 18th Conference on Electrical Performance of Electronic Packaging and Systems (EPEPS), Oct. 19-21, 2009, pp. 199-202.

*Primary Examiner* — Glenn A Auve

(57) ABSTRACT

A method including sorting read/write commands initiated by a memory controller based upon a destination page within a memory device. The read/write commands having a highest priority level are determined. The commands are then categorized as either page movement commands or data movement commands. The page movement commands or data movement commands are sent to the memory device based upon a signal indicating a current direction of a data bus providing communication between the memory controller and the memory device and further based upon a priority level.

20 Claims, 4 Drawing Sheets

(56) References Cited

U.S. PATENT DOCUMENTS

| | | |
|---|---|---|
| 2011/0040902 A1 | 2/2011 | Housty |
| 2011/0090749 A1 | 4/2011 | Bhakta et al. |
| 2011/0320867 A1 | 12/2011 | Chaudhuri et al. |
| 2013/0103890 A1 | 4/2013 | Grunzke |
| 2013/0155788 A1 | 6/2013 | Brandl et al. |
| 2013/0315014 A1 | 11/2013 | Dearth et al. |
| 2014/0029364 A1 | 1/2014 | Bhakta et al. |

\* cited by examiner

METHOD AND SYSTEM FOR CHANGING BUS DIRECTION IN MEMORY SYSTEMS

CROSS-REFERENCE TO RELATED APPLICATIONS

This application is related to patent applications: "HARDWARE CHIP SELECT TRAINING FOR MEMORY USING WRITE LEVELING MECHANISM," filed Dec. 26, 2012, Ser. No. 13/726,926; "HARDWARE CHIP SELECT TRAINING FOR MEMORY USING READ COMMANDS," filed Dec. 26, 2012, Ser. No. 13/727,078; "MULTI-DIMENSIONAL HARDWARE DATA TRAINING BETWEEN MEMORY CONTROLLER AND MEMORY," filed Dec. 26, 2012, Ser. No. 13/727,333; "HARDWARE COMMAND TRAINING FOR MEMORY USING WRITE LEVELING MECHANISM," filed Dec. 27, 2012, Ser. No. 13/728,953; and "HARDWARE COMMAND TRAINING FOR MEMORY USING READ COMMANDS," filed Dec. 27, 2012, Ser. No. 13/728,976, which are all herein incorporated by reference in their entirety.

BACKGROUND OF THE INVENTION

In many memory systems (e.g., DDR, DDR2, DDR3, LPDDR, and PDDR2), both the memory controller and the DRAM chips share the same data bus to communicate with one another. Since data is bidirectional, each end implements both receiver and transmitter logic connected to the data bus signal.

As such, a finite amount of time is required to switch the data direction of the data bus. Further, closing an existing page within memory and opening a new page takes time. Many current systems are implemented in a way that serializes the two processes. As a result, memory commands take a longer time to execute.

BRIEF SUMMARY OF THE INVENTION

Accordingly, a need exists to open a new page within memory without degrading performance. Embodiments of the present invention disclose an apparatus, method, and system for changing bus direction in memory systems, e.g. DDR3 compatible devices in one embodiment.

More specifically, embodiments of the present invention are directed towards a method. The method includes sorting read/write commands initiated by a memory controller based upon a destination page within a memory device. The read/write commands having a highest priority level are determined. The commands are then categorized as either page movement commands or data movement commands. The page movement commands or data movement commands are sent to the memory device based upon a signal indicating a current direction of a data bus providing communication between the memory controller and the memory device and further based upon a priority level.

In another embodiment, the present invention is drawn to an apparatus. The apparatus includes a memory device having a plurality of banks. The apparatus also includes a memory controller. The memory controller includes a plurality of bank arbiters coupled the plurality of banks. The memory controller also includes a plurality of rank arbiters coupled to the plurality of bank arbiters. The memory controller further includes a direction arbiter and a final arbiter. The direction arbiter is coupled to the plurality of bank arbiters and is operable to switch a current direction of a data bus. The direction arbiter asserts a signal for a predetermined time period prior to switching the current direction of the data bus. The direction arbiter further deasserts the signal upon switching the current direction of the data bus. The final arbiter is coupled to the plurality of rank arbiters and is also coupled to the direction arbiter. The final arbiter is operable to receive and categorize read/write commands as one of page movement commands and data movement commands. The final arbiter is operable to determine sending the commands to the memory device based upon the direction of the data bus and a priority level of the commands.

In yet another embodiment, the present invention is drawn to a system. The system comprises a processor coupled to a bus and a display screen coupled to the bus. The system also includes a memory coupled to the bus wherein the memory includes instructions that when executed cause the computer system to implement a method. The method includes programming a memory controller into a mode wherein a column access strobe is active for a single clock cycle. The method includes sorting read/write commands initiated by a memory controller based upon a destination page within a memory device. The read/write commands having a highest priority level are determined. The commands are then categorized as either page movement commands or data movement commands. The page movement commands or data movement commands are sent to the memory device based upon a signal indicating a current direction of a data bus providing communication between the memory controller and the memory device and further based upon a priority level.

BRIEF DESCRIPTION OF THE DRAWINGS

The embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
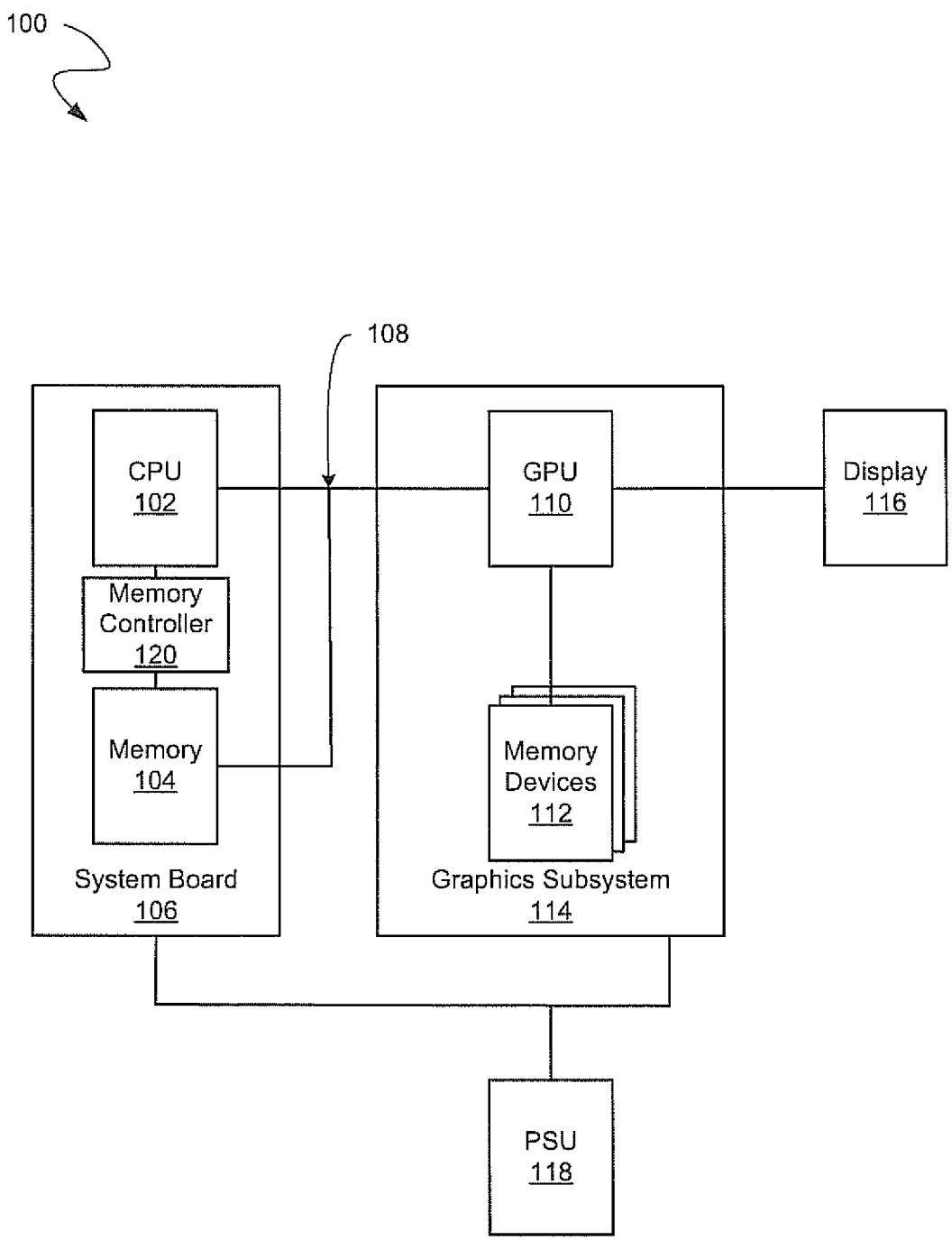
FIG. 1 shows an exemplary computer system, in accordance with one embodiment of the present invention.

FIG. 1 shows an exemplary computer system 100 in accordance with one embodiment of the present invention. Computer system 100 depicts the components in accordance with embodiments of the present invention providing the execution platform for certain hardware-based and software-based functionality, in particular, computer graphics rendering and display capability. In general, computer system 100 comprises a system board 106 including at least one central processing unit (CPU) 102 and a system memory 104. The CPU 102 can be coupled to the system memory 104 via a memory controller 120 or can be directly coupled to the system memory 104 via a memory controller internal (not shown) to the CPU 102. Memory controller 120 may also include a counter (not shown). In an embodiment, system memory 104 may be DDR3 SDRAM.

Computer system 100 also comprises a graphics subsystem 114 including at least one graphics processor unit (GPU) 110. For example, the graphics subsystem 114 may be included on a graphics card. The graphics subsystem 114 may be coupled to a display 116. One or more additional GPU(s) 110 can optionally be coupled to computer system 100 to further increase its computational power. The GPU(s) 110 may be coupled to the CPU 102 and the system memory 104 via a communication bus 108. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, memory devices 112 may be coupled with the GPU 110 for high bandwidth graphics data storage, e.g., the frame buffer. In an embodiment, the memory devices 112 may be dynamic random-access memory. A power source unit (PSU) 118 may provide electrical power to the system board 106 and graphics subsystem 114.

The CPU 102 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 102. Additionally, while embodiments herein may make reference to a GPU, it should be noted that the described circuits and/or functionality can also be implemented with other types of processors (e.g., general purpose or other special-purpose coprocessors) or within a CPU.

System 100 can be implemented as, for example, a desktop computer system or server computer system having a powerful general-purpose CPU 102 coupled to a dedicated graphics rendering GPU 110. In such an embodiment, components can be included that add peripheral buses, specialized audio/video components, IO devices, and the like. Similarly, system 100 can be implemented as a portable device (e.g., cellphone, PDA, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 102, 104, 110, 112, and the like) of a computing device are wholly contained within a single integrated circuit die. Examples include a hand-held instrument with a display, a car navigation system, a portable entertainment system, and the like.

Method and System for Changing Bus Direction in Memory Systems

Figure 2:
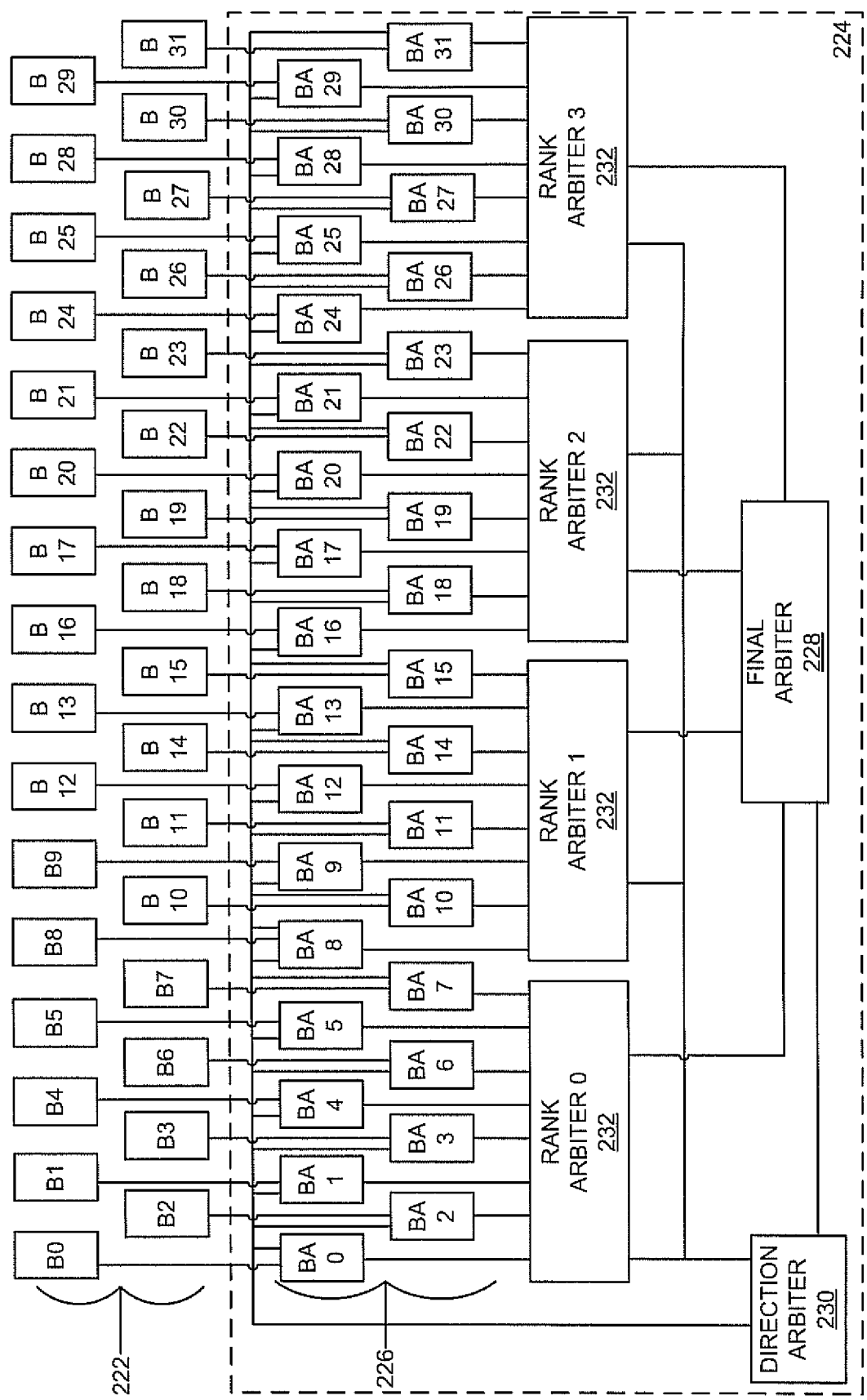
FIG. 2 shows a plurality of arbiters coupled to a plurality of banks within a memory device, in accordance with one embodiment of the present invention.

FIG. 2 shows a plurality of arbiters coupled to a plurality of banks within a memory device, in accordance with one embodiment of the present invention. The plurality of banks 222 reside within memory device 104 (FIG. 1). In an embodiment, memory device 104 (FIG. 1) is a DDR3 device. Banks 222 consist of multiple rows and columns of storage units. In a single read or write command, only one bank 222 is accessed. The plurality of arbiters include a plurality of bank arbiters 226, a plurality of rank arbiters 232, a direction arbiter 230, and a final arbiter 228.

Direction arbiter 230 comprises a finite state machine that includes counters, programmed weights, etc. Direction arbiter 230 is responsible for switching the current direction of the data bus. Direction arbiter 230 asserts a signal for a predetermined time period before switching the direction of the bus. In an embodiment, this signal is called bus_turn. Direction arbiter 230 deasserts the signal after having switched the current direction of the data bus.

Each bank 222 is coupled to a corresponding bank arbiter 226. Each read/write command initiated by memory controller 120 (FIG. 1) and requiring access to banks 222 is kept in order such that the commands may be serviced in order. This is accomplished by the bank arbiters 226. Each bank arbiter 226 is associated with each bank 222 queue and creates a page friendly stream of requests. The bank arbiters 226 access the requests and sort them such that multiple requests in a row hit the same page within the memory device 104 (FIG. 1). In this particular embodiment, there are thirty-two banks 222 and thirty-two corresponding bank arbiters 226.

The bank arbiters 226 are also coupled to direction arbiter 230. Bank arbiters 226 receive inputs from the state machine in direction arbiter 230. The inputs provide information to bank arbiters 226 about the current direction of the bus, if a change to the direction of the bus is forthcoming, whether a request has expired, etc. In this particular embodiment, there are four rank arbiters 232.

In this particular embodiment, each rank arbiter 232 takes inputs from eight bank arbiters 226. The rank arbiters are 232 also coupled to direction arbiter 230. The rank arbiter 232 makes a decision based on inputs provided from the finite state machine in direction arbiter 230 and will select the highest priority command to be executed within the particular rank.

Each command initiated by memory controller 120 (FIG. 1) carries a priority level. In an embodiment, the priority level is a 2-bit signal. The priority level is determined based on the current bus direction and the command requested. If the direction of the command matches with the current bus direction, bit1 of the priority level is set to a logic 1, otherwise it is set to a logic 0. Further, bit0 of the priority level will be set to a logic 1 to indicate that the command has the highest priority level among all the commands. Otherwise, it will be set to a logic 0. Determination of the priority level is determined by a mechanism outside the scope of the present invention.

Final arbiter 228 is coupled to rank arbiters 232 and decides the best commands from the four rank arbiters 232. Final arbiter 228 is responsible for selecting the command to be run on the data bus based on specified criteria. Ultimately, final arbiter 228 forwards the best command for execution to the memory device 104 (FIG. 1). However, a command will only be sent to the final arbiter 228 if the direction of the command is the same as the current data bus direction or opposite to the current data bus direction, but the bus_turn signal is asserted. This indicates that the current data bus direction will soon be changed.

Final arbiter 228 decomposes the high level read/write commands into multiple DRAM commands and then classifies the commands into two categories: page movement commands and data movement commands. Page movement commands are those commands that change the internals of DRAM without transferring any data on the data bus. Some examples of these commands in a DDR3 implementation are: PRECHARGE, ACTIVATE, and PRECHARGE_ALL. Examples of data movement commands in a DDR3 implementation are READ or WRITE.

The priority level in combination with the bus_turn signal are used by the final arbiter 228 to determine whether to send a page movement command or a data movement command on the data bus. A page movement command will be sent on the data bus if bit1 of the priority level is set to a logic 1, indicating that the direction of the command matches with the current bus direction. A data movement command will be sent on the data bus if the bus_turn signal is not asserted, indicating that the current bus direction will not soon be changed. Also, a data movement command will be sent on the data bus if the bus_turn signal is asserted and bit1 of the priority level is a logic 0. This indicates that the current bus direction will soon be changed and the direction of the command does not match the current bus direction, but rather the direction that the current bus direction will soon be changed to.

This scheme of switching the bus direction in the memory system achieves the following. First, just prior to switching the current direction of the data bus, page movement commands for older sets of commands are not sent on the data bus. Prior to this scheme, these older commands would not get executed anyway because the current direction of the data bus would soon be changed. This results in power savings because the commands are not sent. Second, just prior to switching the current direction of the data bus, page movement commands for new sets of commands are sent, thus giving the memory module 104 (FIG. 1) enough time to prepare the pages for access. Third, once the current direction of the data bus is switched, pages within the memory module 104 (FIG. 1) have already been prepared for the new set of commands. Thus, these commands are executed quickly increasing performance of the overall system 100 (FIG. 1).

Figure 3:
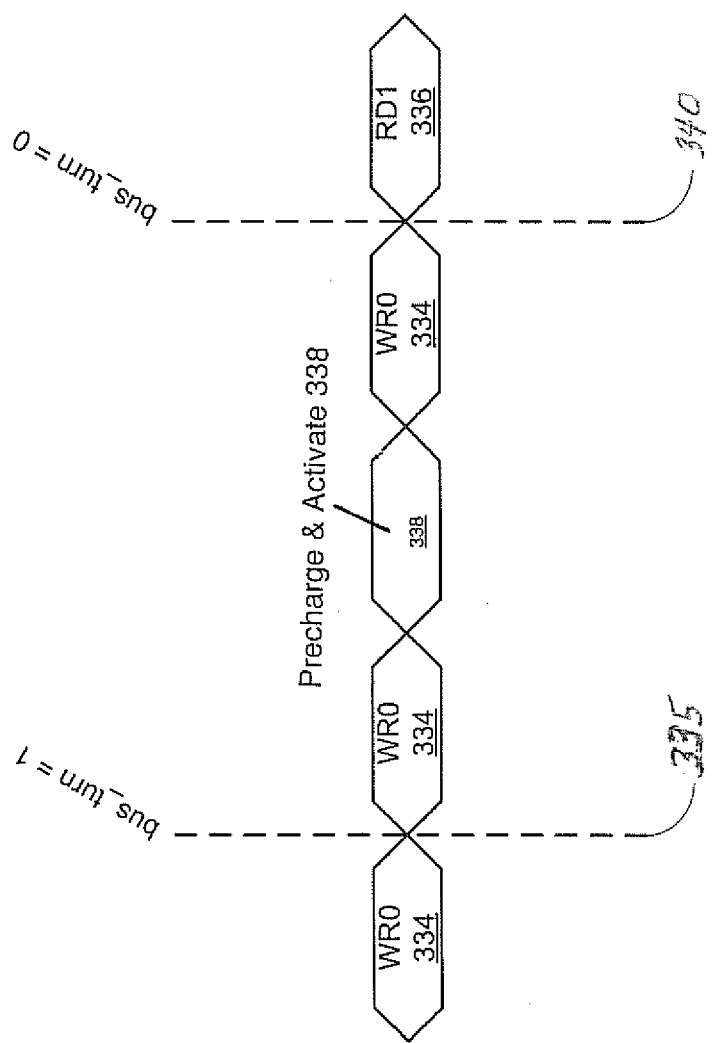
FIG. 3 shows an exemplary data flow, in accordance with one embodiment of the present invention.

FIG. 3 shows an exemplary data flow, in accordance with one embodiment of the present invention. The data flow shows a write command 334 and a read command 336. The data flow begins with a write command 334. After the first cycle, direction arbiter 230 (FIG. 2) asserts bus_turn signal 335, indicating that the direction of the data bus is about to switch in preparation for the upcoming read command 336. As such, precharge and activate 338, page movement commands, are interleaved with write commands 334 with the goal of preparing the page for the upcoming read 336. By the time the write command 334 is finished, bus turn is deasserted 340 indicating that the direction arbiter 230 (FIG. 2) has switched the direction of the data bus. Thereafter, read command 336 can be executed. By interleaving the read 336, write 334, and precharge/activate 338 commands, the commands are executed faster and overall performance of the system 100 (FIG. 1) is increased.

In an embodiment of the present invention, a data management command will always precede a page movement command, thus maximizing the data bus efficiency.

Figure 4:
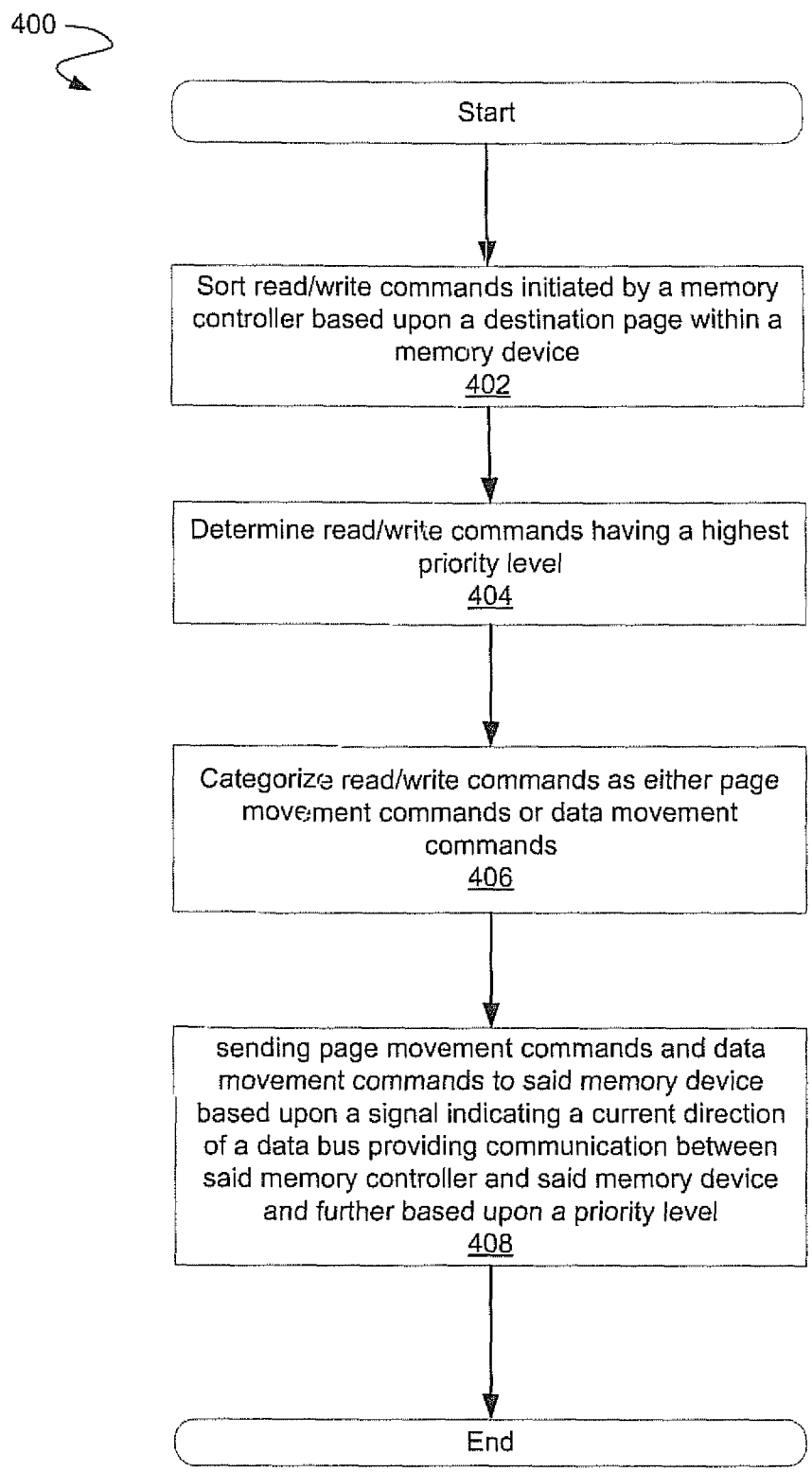
FIG. 4 depicts a flowchart of an exemplary method of changing bus direction in a memory system, in accordance with one embodiment of the present invention.

FIG. 4 depicts a flowchart 400 of an exemplary method of changing bus direction in a memory system, in accordance with one embodiment of the present invention. In block 402, read/write commands that are initiated by a memory controller are sorted based upon a destination page within a memory device. For example, in FIG. 2, the bank arbiters sort the read/write commands based upon the destination page within the memory device.

In block 404, the read/write commands having a highest priority level are determined. In an embodiment, the priority level is a two-bit signal. The first bit of the two-bit signal is asserted if a direction of the read/write command matches with the direction of the data bus. The second bit of the two-bit signal is asserted if the read/write command has the highest priority level.

In block 406, the read/write commands are categorized as either page movement commands or data movement commands. Page movement commands are those commands that change the internals of DRAM without transferring any data on the data bus. Data movement commands are those commands that transfer data on the data bus.

In block 408, the page movement commands and the data movement commands are sent to the memory device based upon a signal indicating a current direction of a data bus providing communication between the memory controller and the memory device and further based upon a priority level. In an embodiment, the signal is asserted for a predetermined time period prior to switching the current direction of the data bus. In yet another embodiment, the signal is deasserted upon switching the current direction of the data bus.

In an embodiment, a final arbiter receives the page movement commands the data movement commands if a direction of the read/write commands matches with the current direction of the data bus or if the direction of the commands does not match with the current direction of the data bus and the signal is asserted. In yet another embodiment, a direction arbiter is coupled to the final arbiter and is operable to switch the current direction of the data bus.

The method of FIG. 4 may be implemented on system 100 (FIG. 1).

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. An apparatus comprising:
   a memory device comprising a plurality of banks; and
   a memory controller comprising:
   a plurality of bank arbiters coupled to said plurality of banks;
   a plurality of rank arbiters coupled to said plurality of bank arbiters;
   a direction arbiter coupled to said plurality of bank arbiters and operable to switch a current direction of a data bus, wherein further said direction arbiter asserts a signal for a predetermined time period prior to switching said current direction of said data bus, and wherein further said direction arbiter deasserts said signal upon switching said current direction of said data bus; and a final arbiter coupled to said plurality of rank arbiters and further coupled to said direction arbiter, wherein said final arbiter is operable to receive and categorize read/write commands as one of page movement commands and data movement commands, wherein further said final arbiter is operable to send said categorized read/write commands to said memory device based upon said current direction of said data bus and a priority level of said commands.

2. The apparatus of claim 1 wherein said plurality of bank arbiters is operable to sort said read/write commands based upon a destination page within said memory device.

3. The apparatus of claim 1 wherein said plurality of rank arbiters is operable to determine read/write commands having a highest priority level.

4. The apparatus of claim 1 wherein said direction arbiter comprises a finite state machine.

5. The apparatus of claim 1 wherein said final arbiter receives said commands if a direction of said commands matches with said current direction of said data bus or if said direction of said commands does not match with said current direction of said data bus and said signal is asserted.

6. The apparatus of claim 1 wherein said final arbiter sends said page movement commands to said memory device if a direction of said commands matches with said current direction of said data bus, and wherein further said final arbiter sends said data movement commands to said memory device if said signal is deasserted or if said signal is asserted and said direction of said commands does not match with said current direction of said data bus.

7. The apparatus of claim 1 wherein said priority level is determined based on whether a direction of said commands matches with said current direction of said data bus.

8. The method of claim 1 wherein said read/write commands are initiated by said memory controller.

9. A method comprising:
sorting read/write commands initiated by a memory controller based upon a destination page within a memory device;
determining read/write commands having a highest priority level;
categorizing read/write commands as either page movement commands or data movement commands; and
sending page movement commands and data movement commands to said memory device based upon a signal indicating a current direction of a data bus providing communication between said memory controller and said memory device and further based upon a priority level.

10. The method of claim 9 further comprising:
asserting said signal for a predetermined time period prior to switching said current direction of said data bus; and
deasserting said signal upon switching said current direction of said data bus.

11. The method of claim 9 wherein said priority level is a two-bit signal, wherein further a first bit of said two-bit signal is asserted if a direction of said read/write commands matches with said current direction of said data bus, and wherein further a second bit of said two-bit signal is asserted if said read/write command has said highest priority level.

12. The method of claim 9 wherein a final arbiter receives said page movement commands and said data movement commands if a direction of said read/write commands matches with said current direction of said data bus or if said direction of said commands does not match with said current direction of said data bus and said signal is asserted.

13. The method of claim 12 wherein a direction arbiter is coupled to said final arbiter and is operable to switch said current direction of said data bus.

14. The method of claim 9 wherein said sending further comprises sending said page movement commands to said memory device if a direction of said commands matches with said current direction of said data bus, and further comprising sending said data movement commands to said memory device if said signal is deasserted or if said signal is asserted and said direction of said commands does not match with said current direction of said data bus.

15. A computer system comprising:
a processor coupled to a bus;
a display screen coupled to said bus; and
a memory coupled to said bus wherein said memory comprises instructions that when executed cause said computer system to implement a method, said method comprising:
sorting read/write commands initiated by a memory controller based upon a destination page within said memory;
determining read/write commands having a highest priority level;
categorizing read/write commands as either page movement commands or data movement commands; and
sending page movement commands and data movement commands to said memory based upon a signal indicating a current direction of a data bus between said memory controller and said memory and further based upon a priority level.

16. The computer system of claim 15 wherein said method further comprises:
asserting said signal for a predetermined time period prior to switching said current direction of said data bus; and
deasserting said signal upon switching said current direction of said data bus.

17. The computer system of claim 15 wherein said priority level is a two-bit signal, wherein further a first bit of said two-bit signal is asserted if a direction of said read/write commands matches with said current direction of said data bus, and wherein further a second bit of said two-bit signal is asserted if said read/write command has said highest priority level.

18. The computer system of claim 15 further comprising a final arbiter and wherein said final arbiter receives said page movement commands and said data movement commands if a direction of said read/write commands matches with said current direction of said data bus or if said direction of said commands does not match with said current direction of said data bus and said signal is asserted.

19. The computer system claim 18 further comprising a direction arbiter and wherein said direction arbiter is coupled to said final arbiter and is operable to switch said current direction of said data bus.

20. The computer system of claim 15 wherein said sending further comprises sending said page movement commands to said memory if a direction of said commands matches with said current direction of said data bus, and further comprising sending said data movement commands to said memory if said signal is deasserted or if said signal is asserted and said direction of said commands does not match with said current direction of said data bus.

* * * * *